United States Patent
Sahin et al.

(10) Patent No.: US 12,522,566 B2
(45) Date of Patent: Jan. 13, 2026

(54) 2-(3-(2-METHYL-6-(P-TOLYL) PYRIDINE-3-YL) UREIDO) BENZENESULFONAMIDE AND DERIVATIVES AS INHIBITOR OF CARBONIC ANHYDRASE IX FOR THE TREATMENT OF CANCER

(71) Applicant: YEDITEPE UNIVERSITESI, Istanbul (TR)

(72) Inventors: Fikrettin Sahin, Istanbul (TR); Eslam Mohammed, Istanbul (TR); Meltem Celik, Istanbul (TR)

(73) Assignee: YEDITEPE UNIVERSITESI, Istanbul (TR)

( * ) Notice: Subject to any disclaimer, the term of this patent is extended or adjusted under 35 U.S.C. 154(b) by 591 days.

(21) Appl. No.: 18/007,749

(22) PCT Filed: Jun. 2, 2020

(86) PCT No.: PCT/TR2020/050477
§ 371 (c)(1),
(2) Date: Dec. 2, 2022

(87) PCT Pub. No.: WO2021/246974
PCT Pub. Date: Dec. 9, 2021

(65) Prior Publication Data
US 2023/0234926 A1    Jul. 27, 2023

(51) Int. Cl.
*C07D 213/75*    (2006.01)
*A61P 35/00*    (2006.01)

(52) U.S. Cl.
CPC ............ *C07D 213/75* (2013.01); *A61P 35/00* (2018.01)

(58) Field of Classification Search
None
See application file for complete search history.

(56) References Cited

FOREIGN PATENT DOCUMENTS

| WO | 2008071421 A1 | 6/2008 |
| WO | 2012087115 A1 | 6/2012 |
| WO | 2012175654 A1 | 12/2012 |

OTHER PUBLICATIONS

Eldehna et al., Journal of Enzyme Inhibition and Medicinal Chemistry, 34(1), 322-332 (Year: 2019).*

(Continued)

*Primary Examiner* — Adam C Milligan
*Assistant Examiner* — Jason M. Nolan
(74) *Attorney, Agent, or Firm* — Bayramoglu Law Offices LLC

(57) ABSTRACT

2-(3-(2-Methyl-6-(p-tolyl) pyridine-3-yl) ureido) benzenesulfonamide (formula I) compound and related pyridine based sulfonamide derivatives are disclosed. The compound of the invention is a carbonic anhydrase targeted small molecule and also an inhibitor of carbonic anhydrase activity and overexpression. Therefore, the compound is useful, as pharmaceutical agent, especially in the treatment and/or prevention of disorders associated with proliferative diseases, such as cancer.

(formula I)

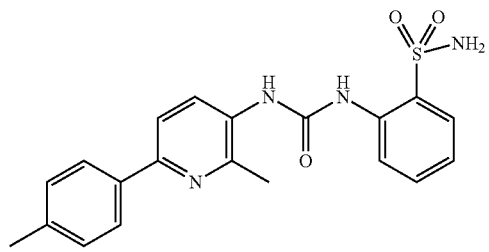

14 Claims, 14 Drawing Sheets

(56) References Cited

OTHER PUBLICATIONS

Halise Inci Gul, et al., New anticancer drug candidates sulfonamides as selective hCA IX or hCA XII inhibitors, Bioorganic Chemistry, 2018, pp. 411-419, vol. 77.

Claudiu Supuran, et al., Carbonic Anhydrase Inhibitors, Medicinal Research Reviews, 2003, pp. 146-189, vol. 23, No. 2.

Sevda Turk, et al., Some N-(5-methyl-1,3,4-thiadiazol-2-yl)-4-[(3-substituted)ureido/thioureido]benzenesulfonamides as carbonic anhydrase I and II Inhibitors, Marmara Pharmaceutical Journal, 2017, pp. 89-95, vol. 21.

* cited by examiner

Control

WES-1

Control

WES-1

Control

WES-1

2-(3-(2-METHYL-6-(P-TOLYL) PYRIDINE-3-YL) UREIDO) BENZENESULFONAMIDE AND DERIVATIVES AS INHIBITOR OF CARBONIC ANHYDRASE IX FOR THE TREATMENT OF CANCER

CROSS REFERENCE TO THE RELATED APPLICATIONS

This application is the national phase entry of International Application No. PCT/TR2020/050477, filed on Jun. 2, 2020, the entire contents of which are incorporated herein by reference.

TECHNICAL FIELD

The present invention discloses and claims 2-(3-(2-Methyl-6-(p-tolyl) pyridine-3-yl) ureido) benzenesulfonamide (formula I) as a novel pyridine based sulfonamide derivative small molecule as an inhibitor of the enzyme carbonic anhydrase IX (CA IX), a protein overexpressed in cancer tissues. The invention also includes the synthetic procedure of formula I. The inhibitor of human carbonic anhydrase IX described in this invention can be used as active ingredient in pharmaceuticals used in cancer therapy. Pharmaceutical compositions comprising formula I and methods for the preparation of formula (I) are also disclosed and claimed.

BACKGROUND

In the current medical era, sulfonamide-based small molecules have stood out as an attractive and promising class for the development of novel anticancer agents with efficient pro-apoptotic activity. Different pyridine-based derivatives have been approved as cancer therapy, to name just a few: Regorafenib (Stivarga®), Crizotinib (Xalkori®) and Sorafenib (Nexavar®) [1-3]. Regorafenib is a pyridine-containing biaryl urea derivative that inhibits several angiogenic kinases such as VEGFR-1/3, PDGFRb, FGFR1, and Tie-2 [4]. Regorafenib was approved, in September 2012, as a therapy for the metastatic colorectal cancer (mCRC) [5]. The antitumor activity of Regorafenib was reported to be mediated via induction of apoptosis, in addition to, its anti-angiogenic and anti-proliferative effects [6, 7].

Crizotinib (Xalkori®), is an orally active multiple receptor tyrosine kinases inhibitor; as (ALK), (HGFR, c-Met), and (RON) [8]. FDA approved Crizotinib for the treatment of adults with previously treated, ALK-positive, advanced non-small cell lung cancer [9]. Crizotinib is thought to exert its anticancer activity through apoptosis and other mechanisms [10].

Moreover, diaryl urea is an important fragment/pharmacophore for the development of small molecules anticancer agents. Urea functionality represents the main pharmacophoric feature in different anticancer therapies like Linifanib, Sorafenib, and Regorafenib [11].

Carbonic anhydrases (CA) are zinc metalloenzymes play an important role in catalyzing the interconversion of carbon dioxide and water to bicarbonate and protons [11]. There are seven distinct CA families ($\alpha$-, $\beta$-, $\gamma$-, $\delta$-, $\zeta$-, $\eta$- and $\theta$-CAs) are known to date [11]. They exist in 15 different a-CA isoforms isolated in humans (h) feature some are cytosolic (CA I, CA II, CA III, CA VII, and CA XIII), others are membrane-bound (CA IV, CA IX, CA XII, CA XIV and CA XV), two of them are mitochondrial (CA VA and CA VB), and one isozyme is secreted in saliva (CA VI) [12]. Overexpression of hCA IX is usually triggered by hypoxia in different solid tumor types, such as breast cancer, glioma and colon carcinoma [13-15]. Thus, inhibition of hCA IX was strongly associated with remarkable suppression of the growth of primary tumor stages and metastases that makes hCA IX a validated target for the treatment of diverse tumors [15]. So, development of hCA IX selective inhibitors stands out as a crucial step to unveil an efficient cancer treatment that devoid of the classical adverse effects attributable to isoforms hCA I and II inhibition.

SLC-0111 is a diaryl urea-based sulfonamide derivative in phase I/II clinical trials for the treatment of advanced hypoxic tumors complicated with metastases. SLC-0111 possessed good selectivity towards inhibition of the transmembrane tumor-related isoforms hCA IX and XII (over the cytosolic isoforms hCA I and II) [16-18].

Colorectal cancer is the third deadliest cancer worldwide, and it is considered to be the fourth leading cause of death. It represents over 9% of all cancer incidences [19]. Now in Western countries, it accounts for approximately 10% of cancer-related mortality [20] and with the highest incidence rates in Australia, New Zealand, Canada, the United States, and parts of Europe [19]. Besides, in the United States colorectal cancer is classified as the third most common cancer diagnosed in both men and women with approximately 101,420 new cases of colon cancer and 44,180 new cases of rectal cancer in the United States, according to the 2019-statistics of The American Cancer, and It's expected to cause about 51,020 deaths during 2019 [21].

Colorectal cancer is known as the slowly developing cancer that begins as a tumor growing on the inner lining of the rectum or colon, known as a polyp, and finally gives rise to cancer. This polyp can form a tumor on the wall of the rectum or colon, and then enter the blood circulation or lymph vessels, and spread to other anatomical sites leading to metastasis. The vast majority (over 95%) of colorectal cancer are classified as adenocarcinomas. These begin in the mucus-making glands lining the colon and rectum [22].

In the international patent document WO2008071421A1, nitro derivative agents of carbonic anhydrase inhibitors are described as potential inhibitors of several carbonic anhydrase isoforms, including isoforms IX and XII. However, none of these compounds are pyridine or sulphonamide derivatives and none are highly selective for CA IX and/or CA XII.

In the international patent document WO2012087115A1, a number of aromatic sulfonamides were presented as carbonic anhydrase IX inhibitors for chemotherapy and radiotherapy. In the international patent document WO2012175654A1, tetraline sulfonamide derivatives as selective inhibitors for CA IX and XII over CA I and II were described.

Despite the presence of various advanced surgical and medical therapies for primary and metastatic colorectal cancer, such as laparoscopic surgery for primary disease; resection of metastatic disease; radiotherapy for rectal cancer; and palliative chemotherapy, the cure rates and long-term survival have only changed by a little percentage more than the last decades [20]. In spite of a large number of different inhibitors of enzyme carbonic anhydrase was developed or discovered, a major issue is their non-specificity and non-selectivity. As a result of non-specific inhibition of all human carbonic anhydrase forms present in the human body, the used inhibitors in clinical studies have many side effects including toxicity. Besides, these therapies cause serious adverse effects affecting the patient quality of life. Development of inhibitors specific toward certain isoform of human carbonic anhydrase thus still remains a current and important task. These needs and other needs are satisfied by the present invention.

SUMMARY

According to a first aspect of the invention there is provided a novel carbonic anhydrase inhibitor of formula I or pharmaceutically acceptable salts thereof. Moreover, this novel small molecule (formula I) is a pyridine based sulfonamide derivative and a tumor associated specific carbonic anhydrase inhibitor, wherein this inhibitor is specific for isoform IX.

The other aspect of the present invention is to provide a carbonic anhydrase inhibitor characterized by its high selectivity toward carbonic anhydrase IX with remarkable suppression of the growth of primary tumor stages and metastases and shows very slight toxicity as the concentration of the drug used to induce apoptosis of fifty percent of the cancer cells has no effect on the healthy human cells.

Another aspect of the present invention is to provide the non-toxic carbonic anhydrase IX inhibitor, formula I or a pharmaceutically acceptable salt thereof. These compounds don't attain any harmful and undesirable effects.

Accordingly, a broad embodiment of the invention is directed to a novel carbonic anhydrase inhibitor compound of formula I or a pharmaceutically acceptable salt thereof:

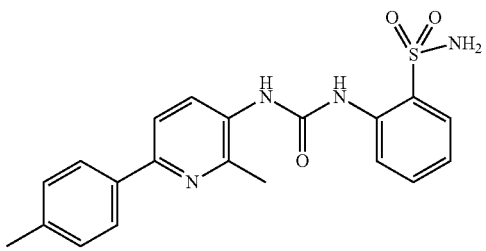 [SMILES: Cc1ccc(-c2ccc(NC(=O)Nc3ccccc3S(N)(=O)=O)c(C)n2)cc1]

The other aspect of the present invention is to provide a specific carbonic anhydrase inhibitor for treating and/or preventing a proliferative disorder, such as cancer, preferably a cancer selected from the group consisting of breast, uterine cervix, ovarian, kidney, lung, esophagus, colorectal, bladder, prostate, brain cancers and more preferably colorectal cancer, wherein the compound is characterized by targeting carbonic anhydrase IX.

Another aspect of the present invention is to provide an organic synthesis method for production of formula I.

The invention can be used for the preparation of a medicament useful in the treatment and/or prevention of disorders due the inhibition of carbonic anhydrase IX overexpression.

Yet another aspect of the present invention is to provide a pharmaceutical composition comprising a pharmaceutical carrier and a therapeutically effective amount of a compound of formula I, or a pharmaceutically acceptable salt thereof.

Further aspect of the present invention relates to a non-therapeutic use of formula I for the diagnostic and/or monitoring of proliferative disorders such as cancer, preferably of colorectal cancer.

This object and other objects of this invention become apparent from the detailed discussion of the invention that follows.

BRIEF DESCRIPTION OF THE DRAWINGS

The present invention is illustrated in the accompanying figures wherein;

FIGS. 1A-1C are illustrations of the percentage of viable HCT116 cells treated with Formula 1, wherein FIG. 1A: after 24 hrs (P<0.0001); FIG. 1B: after 48 hrs (P<0.0001); FIG. 1C: after 72 hrs (P<0.0001).

FIGS. 3A-3I are illustrations of Annexin V Apoptosis Assay, wherein FIGS. 3A-3C: HCT116 Cells treated with Formula I for 24 hours (P>0.001); FIGS. 3D-3F: HCT116 Cells treated with Formula I for 48 hours (P>0.0001); FIGS. 3G-3I: HCT116 Cells treated with Formula I for 72 hours (P>0.0001).

FIGS. 4A-4B are illustrations of Cell cycle assay, wherein FIG. 4A: HCT116 cells treated with Formula I for 48 hours (P<0.05), FIG. 4B: HCT 116 cells treated with Formula I for 72 hours (P<0.0001).

FIG. 5A: untreated negative control cells; and FIG. 5B: cells treated with Formula I, (Scale bar represents 20 μm).

DETAILED DESCRIPTION OF THE EMBODIMENTS

Figure 1A:
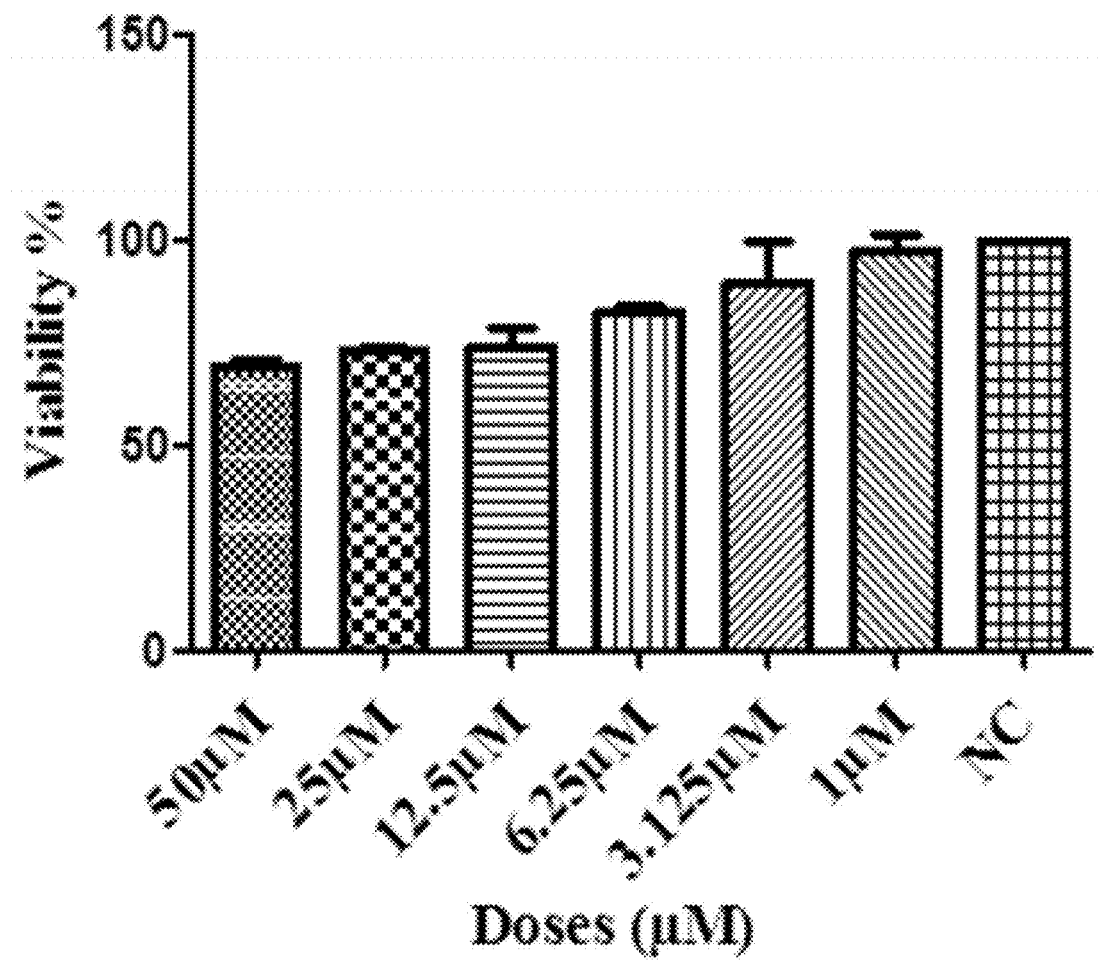

The present invention describes a new pyridine based sulfonamide derivative and its specific inhibitory effect toward carbonic anhydrase IX, an overexpressed enzyme in cancer tissues. The invention also includes the synthetic procedure.

The present invention relates to a carbonic anhydrase inhibitor (formula I).

Unless specified otherwise, the term "formula I" or "compound" or "small molecule" or "inhibitor" refers to compounds of formula I, prodrugs thereof, salts of the compound and/or prodrug, hydrates or solvates of the compound, stereoisomers, tautomers, isotopically labeled compounds, polymorphs, and derivatives of formula I.

It is an object of this invention to provide a specific carbonic anhydrase inhibitor compound having the chemical name 2-(3-(2-Methyl-6-(p-tolyl) pyridine-3-yl) ureido) benzenesulfonamide as inhibitor of the activity and/or overexpression of carbonic anhydrase IX.

In accordance with the purpose(s) of the invention, as embodied and broadly described herein, the present invention relates to a specific carbonic anhydrase inhibitor compound, capable of inhibiting the activity and/or overexpression of carbonic anhydrase IX. In this regard, the invention relates to a compound having the following formula I:

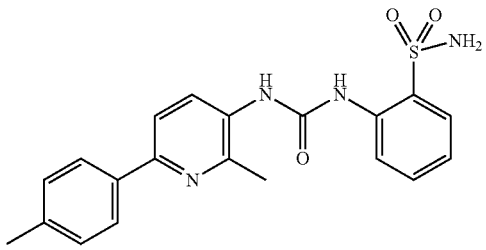 [SMILES: Cc1ccc(-c2ccc(NC(=O)Nc3ccccc3S(N)(=O)=O)c(C)n2)cc1]

or a pharmaceutically acceptable salt thereof.

The present invention, 2-(3-(2-Methyl-6-(p-tolyl) pyridine-3-yl) ureido) benzenesulfonamide (formula I), can be obtained according to general synthesis schemes A-D. The scheme shows the general procedure followed in the synthesis of the formula I according to the present invention.

A) The synthesis was started by hydrazinolysis of ester 1 via reaction with hydrazine hydrate in ethyl alcohol to afford 2-methyl-6-(p-tolyl) nicotinohydrazide 2. ((i); Ethanol, NH2NH2·H2O, reflux for 3 h)

B) Treatment of nicotinohydrazide 2 with sodium nitrite in cold hydrochloric acid furnished nicotinoyl azide 3. ((ii); NaNO2, HCl, stirring for 2 h)

C) Nicotinoyl azide 3 then subjected to Curtius rearrangement upon stirring in refluxing dry xylene to produce the corresponding isocyanate derivative 4. ((iii); Xylene, reflux 1 h)

D) Finally, target sulfonamide formula I was obtained through the reaction of isocyanate 4 with 2-aminobenzenesulfonamide 5 in refluxing xylene with 83% yield. ((iv); Xylene, reflux for 7 h)

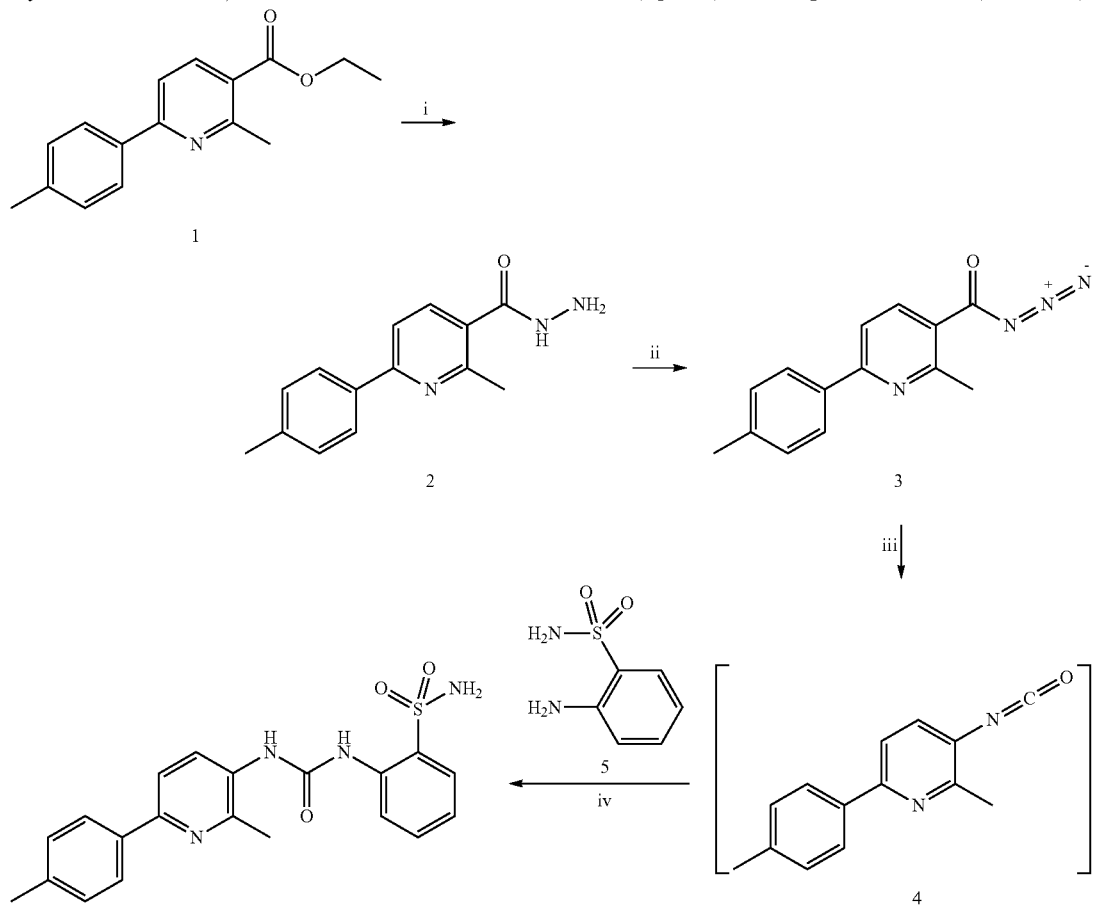

The salts of the compounds described herein can be synthesized from the parent compound by conventional chemical methods.

Measuring the inhibition constant of formula I towards the carbonic anhydrase isoforms (I, II, IV and IX) showed that this compound is specific towards the said tumor-associated enzyme isoform, carbonic anhydrase IX. (Table 1)

The carbonic anhydrase inhibitory activity of Formula I was evaluated towards the physiologically relevant hCA isoforms, hCA I, II (cytosolic) as well as hCA IX and XII (transmembrane, tumor-associated isoforms) using an applied photophysics stopped-flow instrument for assaying the CA-catalyzed CO2 hydration activity [24]. Their inhibitory activities were compared to SLC-0111 and the clinically used standard carbonic anhydrase inhibitor acetazolamide (AAZ). The inhibition data are displayed in Table 1.

TABLE 1

Inhibition data of human CA isoforms hCA I, II, IV, and IX for Formula 1, determined by stopped-flow CO2 hydrase assay, using SLC-0111 and acetazolamide (AAZ) as reference drugs.

| Comp. | $K_I$ (nM)* | | | |
| --- | --- | --- | --- | --- |
|  | hCAI | hCA II | hCA IV | hCA IX |
| Formula I | >10000 | 7181.0 | >10000 | 55.9 |
| SLC-0111 | 5080 | 960 | 286 | 45 |
| AAZ | 250 | 12 | 74 | 25.8 |

*Mean from 3 different assays, by a stopped-flow technique (errors were in the range of 5-10% of the reported values).

From the table we can notice that the inhibition constant ($K_I$; nM) of this specific inhibitor (Formula I) towards the hCA IX, which enhances the tumor cell proliferation and tumor [26], is 55.9 nM which is remarkably lower than the inhibition constant ($K_I$; nM) towards hCA I, hCA II and/or hCA IV. Besides, the inhibition constant of this specific inhibitor (Formula I) ($K_I$=55.9 nM) towards the hCA IX is approximately near to the inhibition constant of the reference drugs (SLC-001 and AAZ) ($K_I$=45 nM, and 25.8 nM, respectively) toward hCA IX. According to the data in the table, the specific inhibitor (Formula I) shows high affinity towards the hCA IX.

According to the present invention, it was found that Formula I exhibits anti-proliferative activity against human colorectal carcinoma cell line (HCT 116). These findings are consistent with the cell viability assay shown in examples.

It has been found that the sulfonamide derivative compound described herein have anti-tumor and anti-cancer activity and are useful in the treatment, diagnosis and/or prognosis of proliferative disorders in subjects.

According to the present invention it was found that formula I has as anti-proliferative and apoptotic effect against certain cancer types, in particular human colorectal cancer.

Furthermore, it was discovered that, as a result of this inhibition, the expression of carbonic anhydrase IX is regulated by the formula I resulting in suppression of the function thereof. Formula I functions as an anti-proliferative agent mediated via induction of apoptosis.

In a further aspect, the present invention relates to a compound (formula I) that inhibits carbonic anhydrase IX protein and negatively modulates its activity.

In one embodiment of the invention, the disclosed compound exhibits selectivity and high affinity for the carbonic anhydrase protein. Thus, the inhibition is potent.

According to literature, inhibition of carbonic anhydrase IX, which plays a role in tumor cell proliferation and tumor progression, by binding of the compound WES-1 to carbonic anhydrase IX results in suppression of tumor cell proliferation and migration.

As used herein, the term "inhibit", "inhibition" or "inhibiting" refers to the reduction or suppression of a given condition, symptom, or disorder, or disease, or a significant decrease in the baseline activity of a biological activity or process such as carbonic anhydrase.

The term "a therapeutically effective amount" of a compound of the present invention refers to a non-toxic and sufficient amount of the compound of the present invention that will elicit the biological or medical response of a subject, for example, inhibition of the protein activity, or ameliorate symptoms, alleviate conditions, slow or delay disease progression, or prevent a disease or disorder, etc.

All of the various embodiments of the present invention as disclosed herein relates to methods of treating and/or preventing various diseases and disorders as described herein. As stated herein the compound used in the method of this invention is capable of inhibiting the carbonic anhydrase IX enzyme activity.

The invention further provides methods for the treatment or prevention of proliferative disorders. In the present invention, the term "proliferative disorders" includes neoplasm and cancers, dysplasia, premalignant or precancerous lesions, abnormal cell growths, benign tumors, malignant tumors, or metastasis, and preferably refers to cancer.

Moreover, the invention relates to a pharmaceutical composition comprising such compounds, uses and methods of use for such compounds in the treatment and/or prevention of disorders associated with overexpression of carbonic anhydrase IX enzyme. In other embodiment of the present invention, a pharmaceutical composition comprising the compound is useful in the treatment and/or prevention of proliferative disorders due the inhibition of carbonic anhydrase IX activity.

The present invention relates to pharmaceutical compositions comprising a pharmaceutical carrier and a therapeutically effective amount of a compound of formula I, or a pharmaceutically acceptable salt thereof.

In one aspect, the disclosure relates to a method for the manufacture of a medicament for inhibiting carbonic anhydrase IX activity and/or overexpression in a mammal comprising combining a therapeutically effective amount of a disclosed compound with a pharmaceutically acceptable carrier or diluent.

These examples are intended to representative of specific embodiments of the invention, and are not intended as limiting the scope of the invention.

Specific Embodiments

In these embodiments, an organic synthesis procedure was applied to provide the small molecule, formula I, that specifically inhibit the carbonic anhydrase IX protein. After obtaining the candidate molecule by the synthesis method illustrated in Scheme A-D, experimental studies lead to determine a compound (formula I) that specifically binds to carbonic anhydrase IX. Furthermore, characterization of the inhibitory activity of formula I was studied in vitro.

EXAMPLES

Example 1 Synthesis of the Compound According to the Invention

Chemistry Part

Melting points were measured with a Stuart melting point apparatus and were uncorrected. Infrared (IR) Spectra were recorded as KBr disks using Schimadzu FT-IR 8400S spectrophotometer. 1H-NMR and 13C-NMR experiments were carried out using Bruker NMR spectrometer (400/100 MHz). Chemical shifts ($\delta H$) are reported relative to TMS as the internal standard. All coupling constant (J) values are given in hertz. Chemical shifts ($\delta C$) were reported as follows: s, singlet; d, doublet; m, multiplet. All reagents and solvents were dried and purified by the standard techniques. Compounds 1 and 2 were previously prepared.

General Procedures for Preparation of the Target Sulfonamide Formula I

A solution of 2-methyl-6-(p-tolyl) nicotinohydrazide 2 (1.2 g, 5 mmol) and sodium nitrite (0.5 g, 7 mmol) in hydrochloric acid was stirred for 1 hour in an ice bath, then stirring was continued at r.t. for another 1 hour and poured over crushed ice. The obtained solid was filtered and air-dried to afford 2-methyl-6-(p-tolyl) nicotinoyl azide 3, which used in the next step without further purification. 2-Methyl-6-(p-tolyl) nicotinoyl azide 3 was heated in refluxing dry xylene for 1 hour then 2-aminobenzenesulfonamide 5 (0.86 g, 5 mmol) was added to this solution. Then reaction mixture was heated under reflux temperature for 7 hours. The obtained solid, after cooling to r.t., was filtered off, washed with diethyl ether and recrystallized from dioxan to furnish the target sulfonamide Formula I.

2-(3-(2-Methyl-6-(p-tolyl) pyridine-3-yl) ureido) benzenesulfonamide (Formula I)

White crystals (yield 83%), m.p. 213-215° C.; IR (KBr, v cm-1): 3207 (NH2), 1713 (C=O) and 1342, 1161 (SO2); 1H NMR (DMSO-d6, 400 MHz) δ ppm: 2.33 (s, 3H, CH$_3$), 2.53 (s, 3H, CH$_3$), 7.15 (dt, 1H, H-4 of 2-(H2NO2S)—C6H4, J=8.4, 1.2 Hz), 7.24 (d, 2H, H-3 and H-5 of 4-(H3C)—C6H4, J=8.0 Hz), 7.49 (dt, 1H, H-5 of 2-(H2NO2S)—C6H4, J=8.4, 1.2 Hz), 7.71 (d, 1H, H-5 pyridine, J=8.4 Hz), 7.79 (dd, 1H, H-3 of 2-(H2NO2S)—C6H4, J=8.0, 1.2 Hz), 7.92 (d, 2H, H-2 and H-6 of 4-(H3C)—C6H4, J=8.0 Hz), 7.96 (d, 1H, H-6 of 2-(H2NO2S)—C6H4, J=8.4 Hz), 8.03 (d, 1H, H-4 pyridine, J=8.4 Hz), 8.24 (s, 1H, NH, D2O exchangeable), 8.27 (s, 1H, NH, D2O exchangeable); 13C NMR (DMSO-d6, 100 MHz) δ ppm: 21.25 (CH3), 22.03 (CH3), 117.70, 122.88, 124.29, 126.41 (2C), 127.81, 129.68 (2C), 131.13, 132.65, 132.71, 132.90, 136.22, 136.59, 138.18, 149.91, 150.47, 153.26 (C=O).

Example 2 Specific Inhibitory Effect of Formula I on Carbonic Anhydrase IX

CA Inhibitory Assay

An Applied Photophysics stopped-flow instrument has been used for assaying the CA catalysed CO2 hydration activity. Phenol red (at a concentration of 0.2 mM) has been used as indicator, working at the absorbance maximum of 557 nm, with 20 mM Hepes (pH 7.5) as buffer, and 20 mM Na2SO4 (for maintaining constant the ionic strength), following the initial rates of the CA-catalyzed CO2 hydration reaction for a period of 10-100 s. The CO2 concentrations ranged from 1.7 to 17 mM for the determination of the kinetic parameters and inhibition constants. For each inhibitor, at least six traces of the initial 5-10% of the reaction have been used for determining the initial velocity. The uncatalyzed rates were determined in the same manner and subtracted from the total observed rates. Stock solutions of inhibitor (0.1 mM) were prepared in distilled-deionized water, and dilutions up to 0.01 nM were done with the assay buffer. Inhibitor and enzyme solutions were preincubated together for 15 min at room temperature prior to assay, in order to allow for the formation of the E-I complex. The inhibition constants were obtained by non-linear least-squares methods using PRISM 3 and the Cheng-Prusoff equation, and represent the mean from at least three different determinations.

Example 3 Biological Evaluation

Cell Culture

HCT 116, a human colorectal carcinoma cell line, and human umbilical vein endothelial cells (HUVEC) were obtained from ATCC, USA and grown in high glucose DMEM medium (Invitrogen) containing 10% heat-inactivated fetal bovine serum 1% penicillin/streptomycin/amphotericin (Life Technologies™, USA).

Cell Viability Assay

The percentage of viable Colorectal cancer cells (HCT 116 cells) and human umbilical vein endothelial cells (HUVEC) after treatment with different concentration of Formula I (50 µM, 25 µM, 12.5 µM, 6.25 µM, 3.125 µM, 1 µM) for 24, 48, and 72 hours, respectively, and incubation at temperature 37° C., 80% relative humidity and 5% CO2, which are the normal cell culture conditions, was determined by 3-(4,5-dimethylthiazol-2-yl)-5-(3-carboxymethoxyphenyl)-2-(4-sulfophenyl)-2H-tetrazolium (MTS) reduction assay (Cell titer 96® Aqueous MTS reagent powder, Promega®). Besides, the IC50 of formula I drug, the dose causing fifty percent cell death of HCT 116 cells, was determined by using GraphPad software.

Figure 1B:
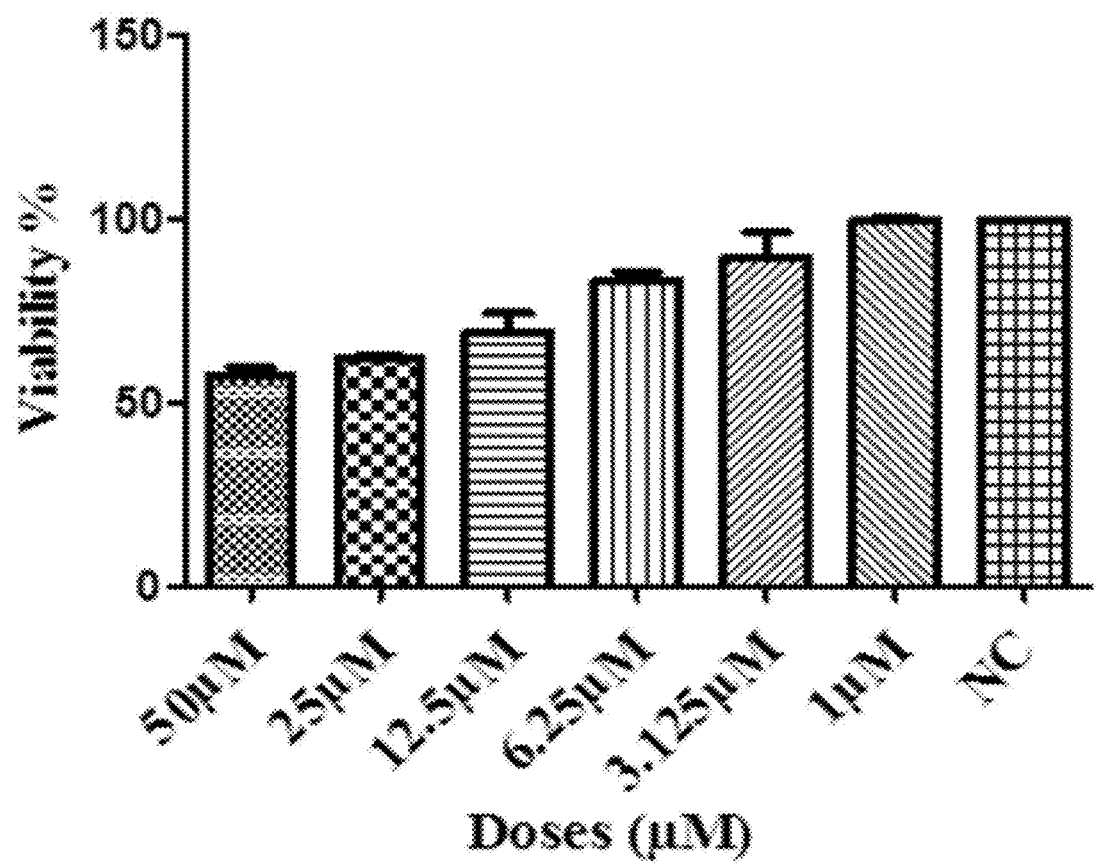
Figure 1C:
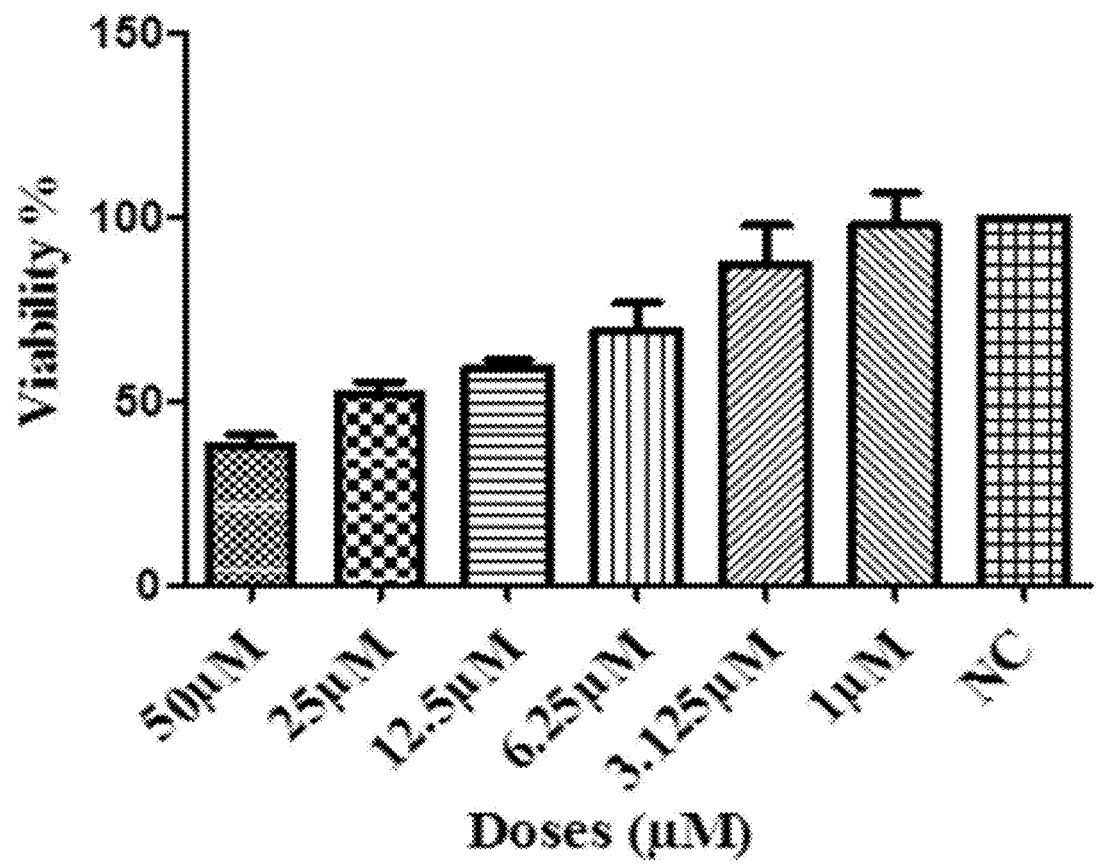
Figure 2:
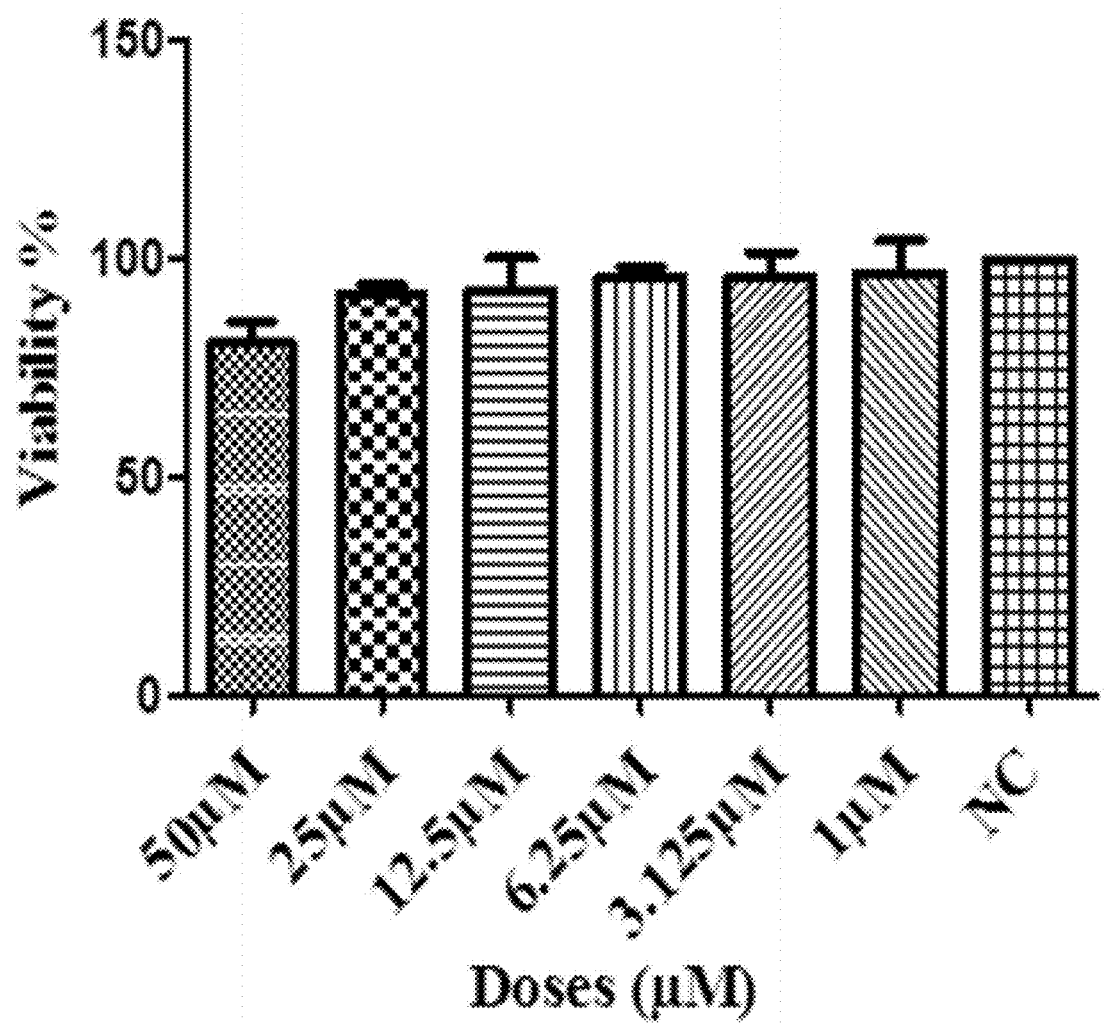
FIG. 2 is an illustration of the percentage viability of HUVEC cells treated with Formula I for 72 hours (non-significant).

After incubation of HUVEC cells (healthy cells) with different concentrations of Formula I drug for 24 hrs, 48 hrs (data not shown), and 72 hrs (FIG. 2), respectively, we found that the average viability upon treatment with Formula I at concentration of 50 µM was 80.53%, while upon treatment with concentrations (25 µM, 12.5 µM, 6.25 µM, 3.125 µM, 1 µM) the average viability range was between 92.07% to 96.89%. On the other hand, the average viability range of HCT 116 cells (human colorectal carcinoma cell line) upon treatment with Formula I at concentrations (50 µM, 25 µM, 12.5 µM, 6.25 µM, 3.125 µM, 1 µM) for 24 hrs was between 69.28% to 97.31% (FIG. 1A), while after treatment for 48 hrs the range was between 57.60% to 99.96% (FIG. 1B), moreover, the viability range after 72 hrs treatment was between 38.15% to 97.82% (FIG. 1C). From the results mentioned above of HCT 116 cells' viability, the $IC_{50}$ was calculated by GraphPad software, and it was about 24 µM.

Annexin V-FITC Apoptosis Detection Assay

HCT 116 cells were treated with the IC50 of Formula I for 24, 48, and 72 hours, respectively, and incubated at temperature 37° C., 80% relative humidity and 5% CO2. The apoptotic cells were detected by flow cytometry (Beckman flow cytometer) using ApoDETECT™ Annexin V-FITC Kit (Life Technologies™, USA) according to the manufacturer's protocol.

Figure 3A:
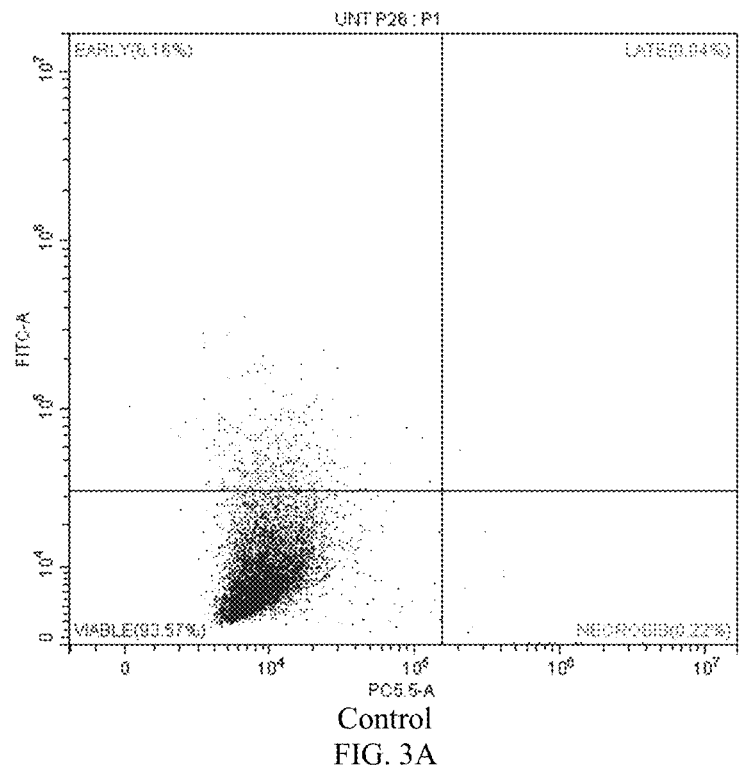
Figure 3B:
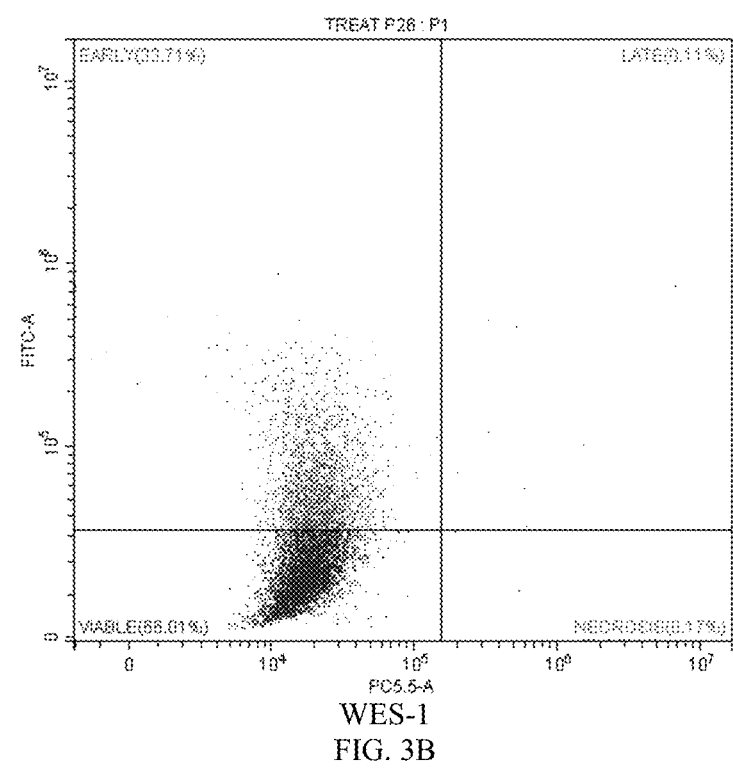
Figure 3C:
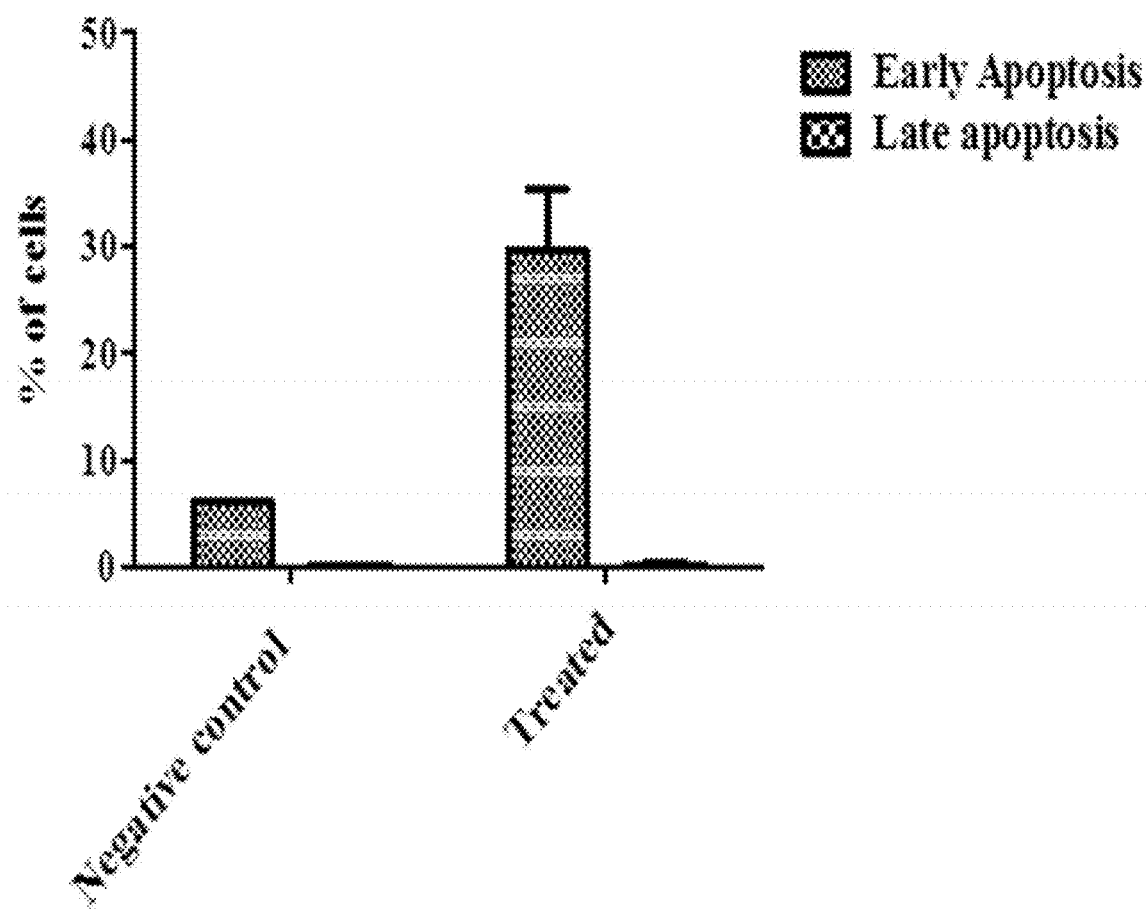
Figure 3D:
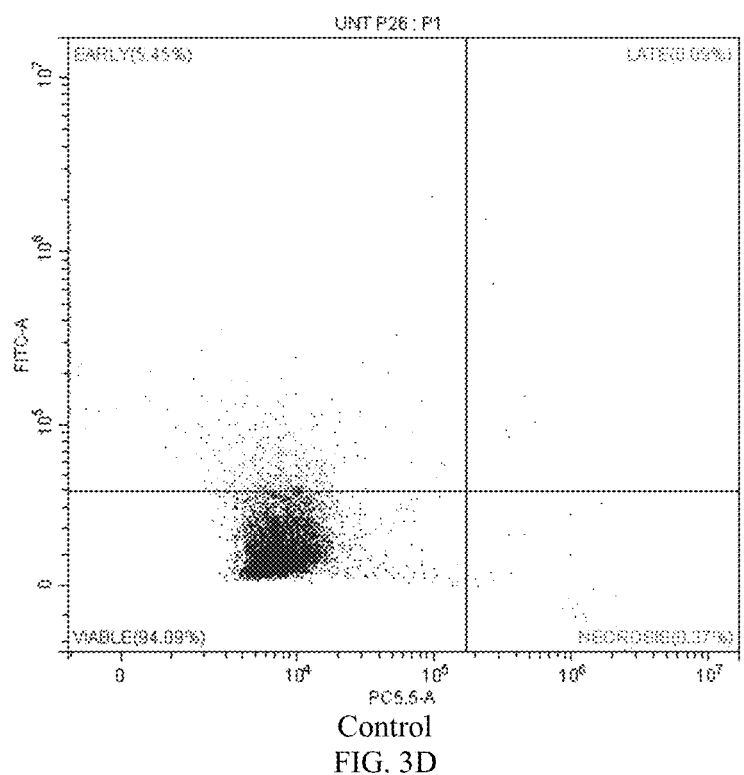
Figure 3E:
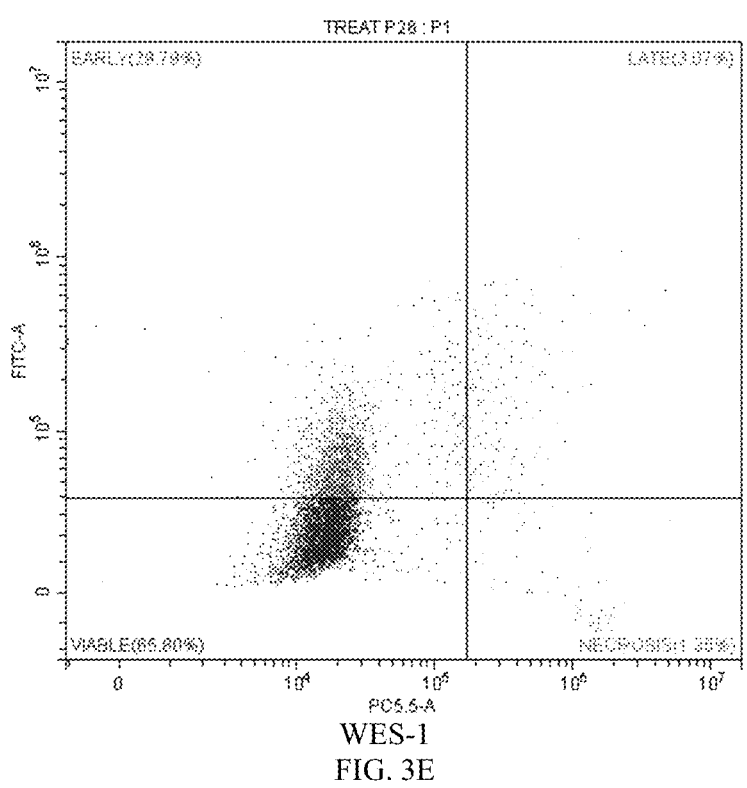
Figure 3F:
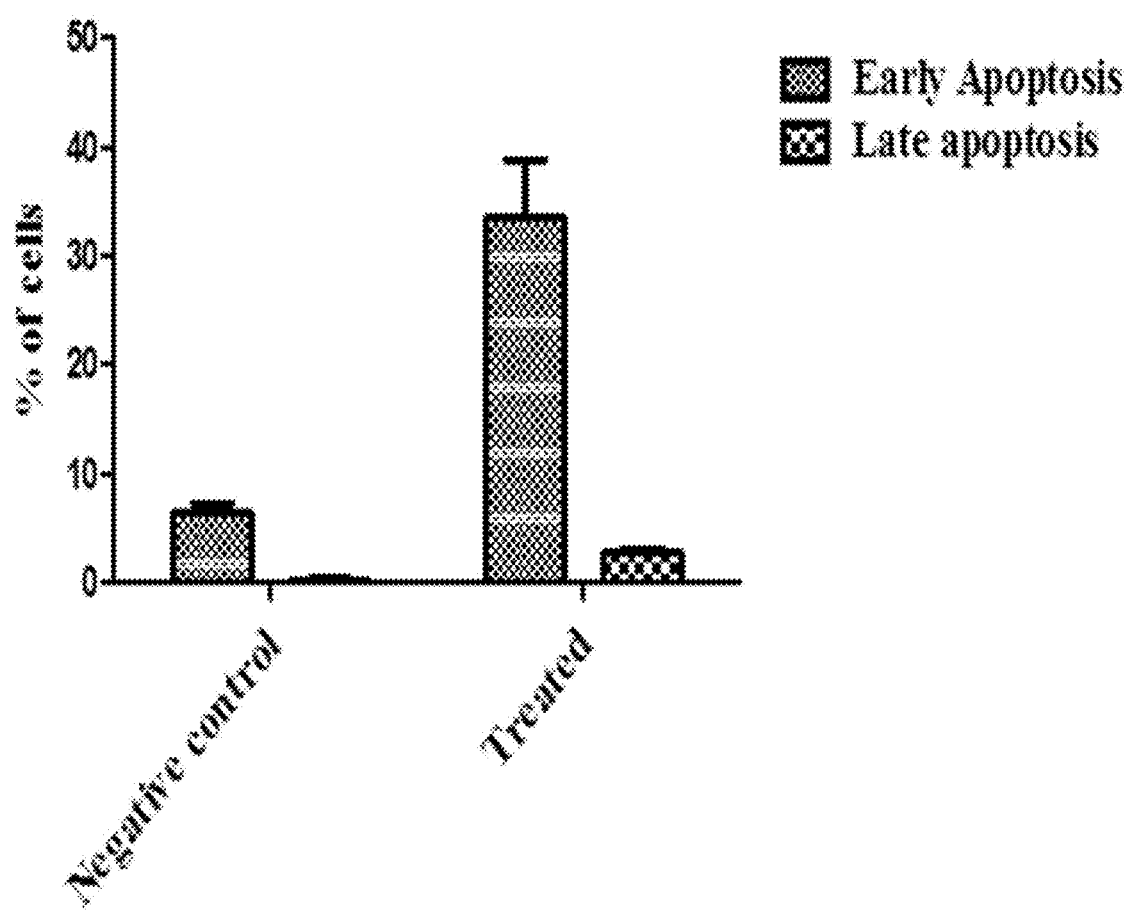
Figure 3G:
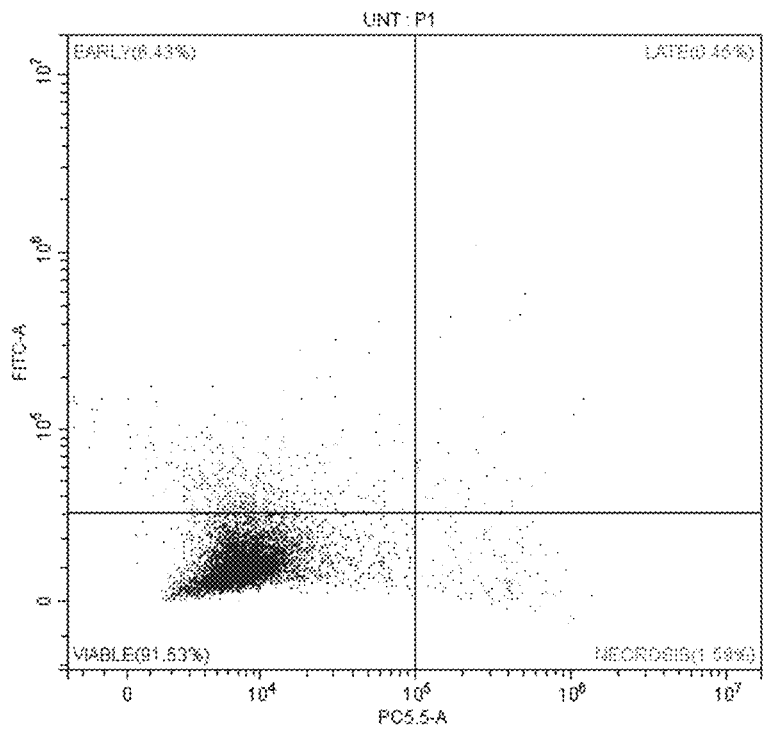
Figure 3H:
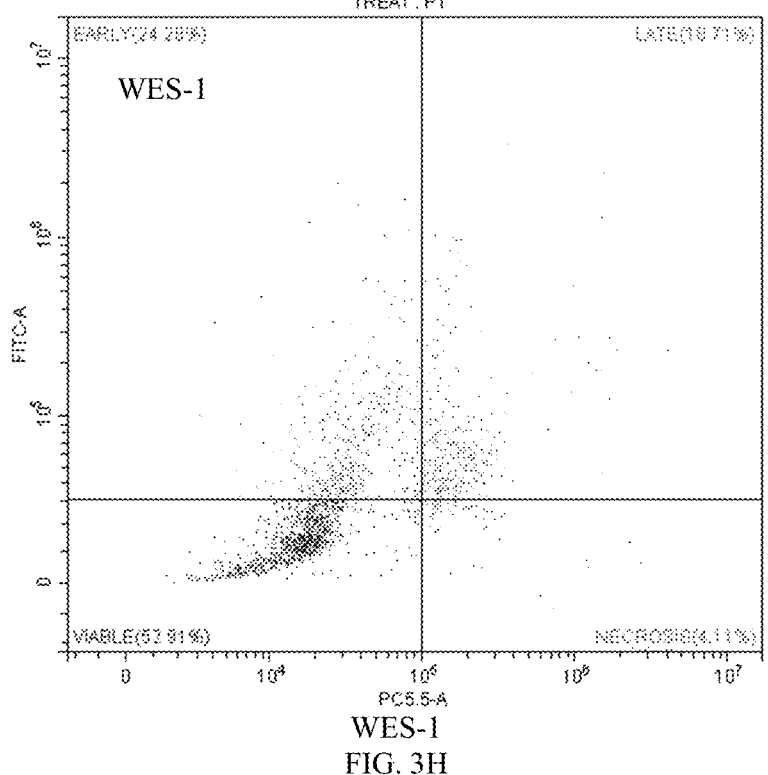
Figure 3I:
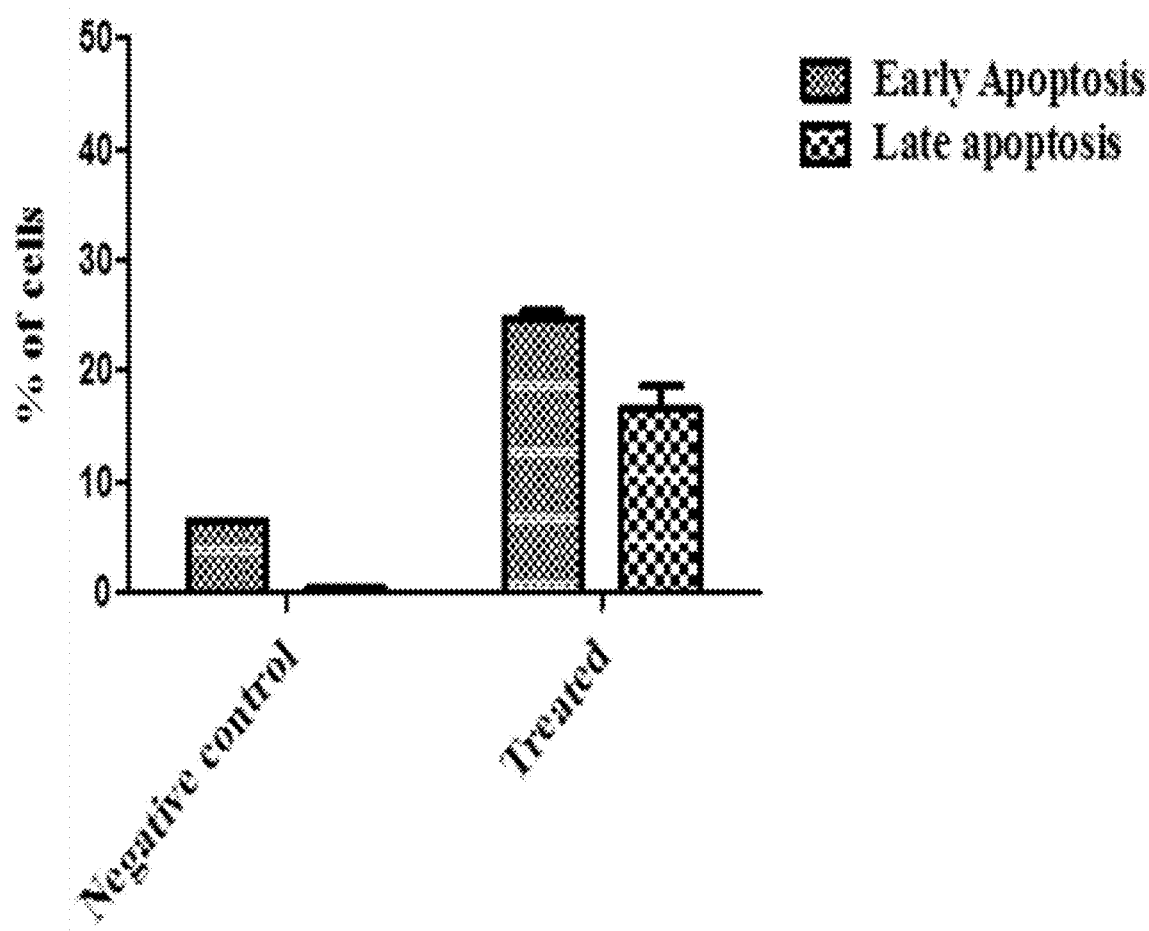

Treatment of HCT 116 cells with Formula I for 24 hrs induced an increase in the percentage of early apoptotic cells by about 30% (FIGS. 3A-3C), while upon incubation for 48 hrs the percentage of cells undergoing early apoptosis became about 33% (FIGS. 3D-3F). Moreover, upon treatment of HCT 116 cells with Formula I for 72 hrs, we found that the percentage of cells in early-stage apoptosis became 25% while the percentage of cells in late-stage apoptosis was about 16.5% (FIGS. 3G-3I). These findings are consistent with the cell viability assay which indicated that Formula I drug exhibits anti-proliferative activity against human colorectal carcinoma (HCT 116) cell line.

Cell Cycle Analysis by Flow Cytometry

HCT 116 cells were treated with the IC50 of Formula I for 48 and 72 hours, respectively, and incubated at temperature 37° C., 80% relative humidity and 5% CO2. Cell cycle was analysed by quantification of DNA content by propidium iodide staining to determine the effect of Formula I on cell cycle progression.

Figure 4A:
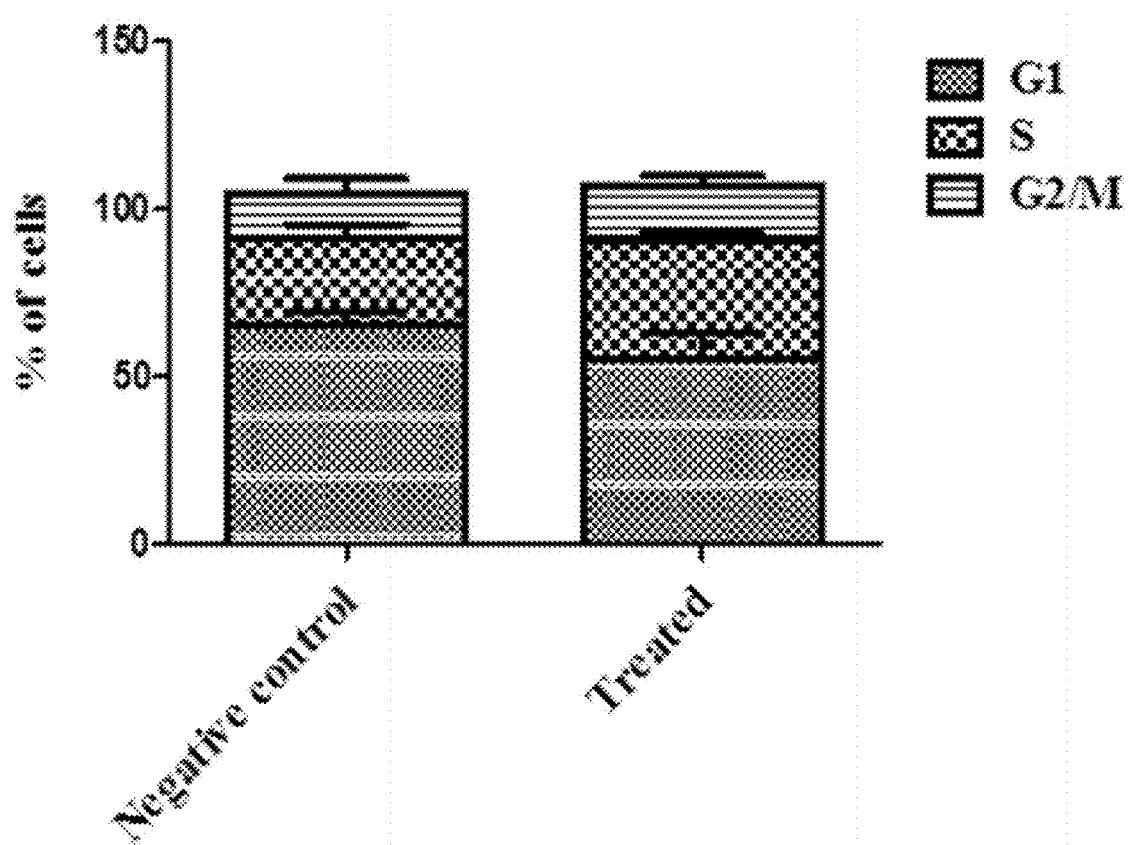
Figure 4B:
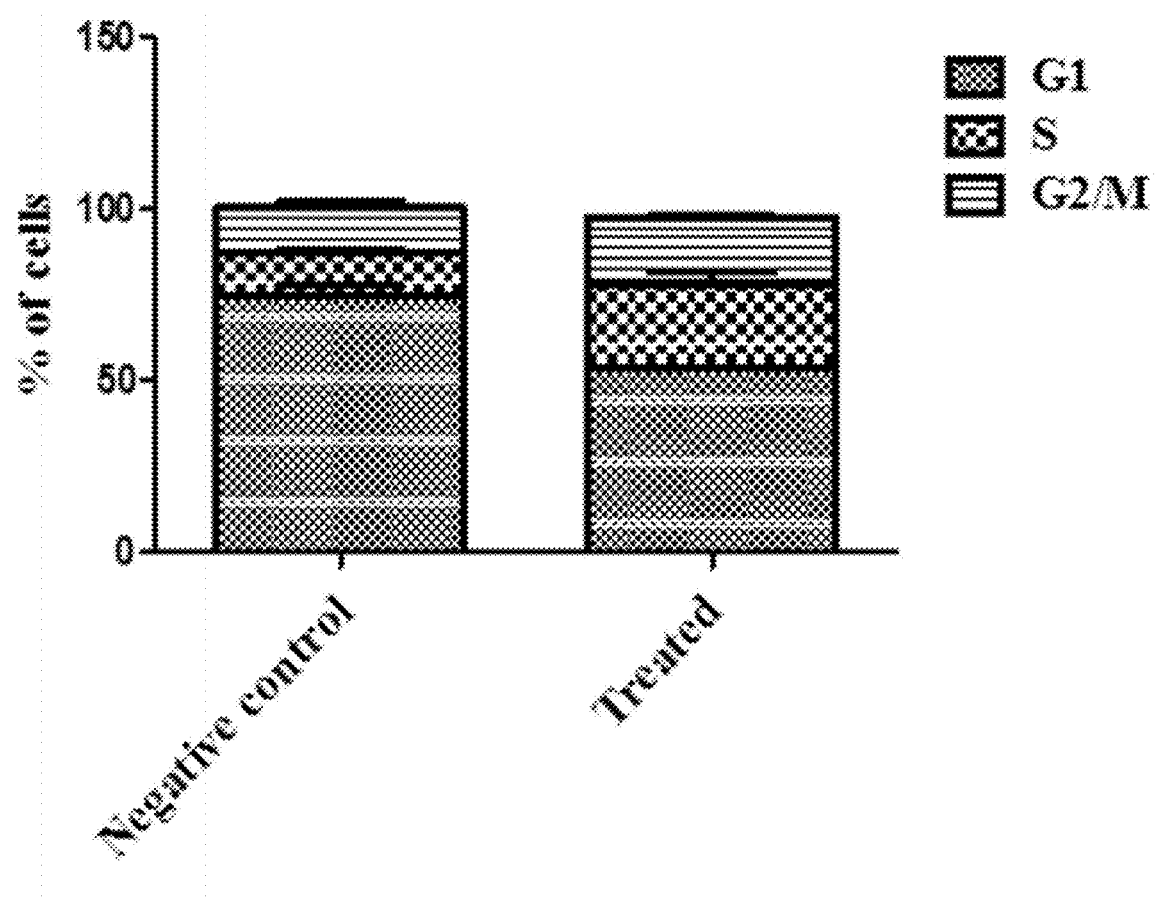

Upon treatment of HCT 116 cells with formula I for 48 and 72 hrs (FIGS. 4A-4B), respectively, it was noticed that there was a decrease in the percentage of the cells in G1 phase, while the percentage of cells in S phase increased. These findings indicated that the cells were arrested in S phase and accumulation of cells in S phase offers the blockade of DNA replication that resulted in the induction of apoptosis [25].

TUNEL (DNA Fragmentation) Assay

The apoptosis was confirmed by TUNEL assay which detects the DNA fragmentation which is a characteristic for later stages of apoptosis. HCT 116 cells were seeded on a coverslip, treated with the IC50 of Formula I and incubated for 72 hours at temperature 37C degree, 80% relative humidity and 5% $CO_2$. After treatment, the Click-iT™ Plus TUNEL assay (Invitrogen™) with the Alexa Fluor™ 488 dye (green) was utilized to detect the fragmented DNA, and cells were counterstained with DAPI( ). Stained cells were analysed under the confocal microscope.

Figure 5A:
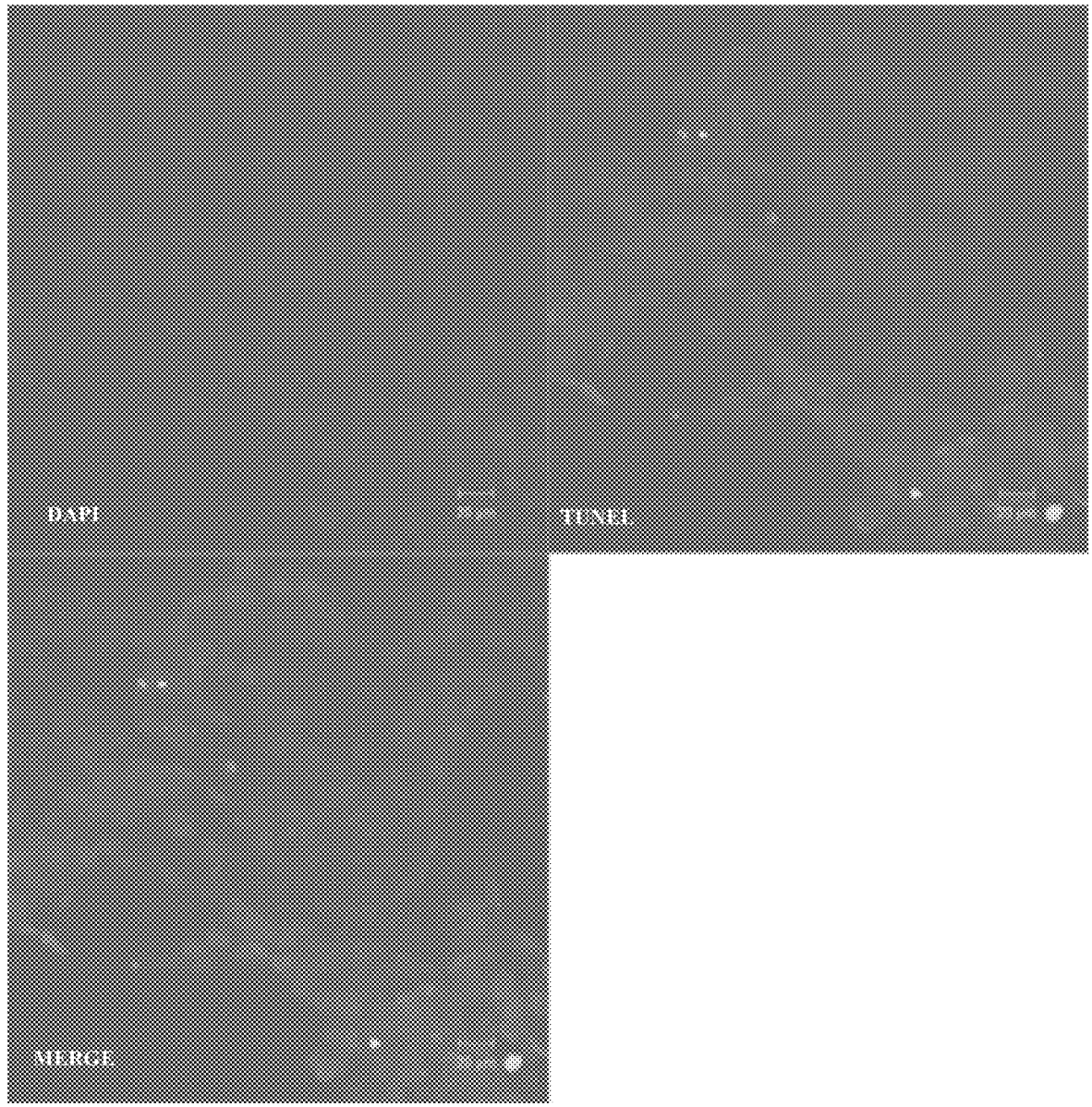
FIGS. 5A-5B are illustrations of presentation of apoptotic cells by TUNEL assay. Cells were labelled with TUNEL staining and DAPI staining, apoptotic cells were green.
Figure 5B:
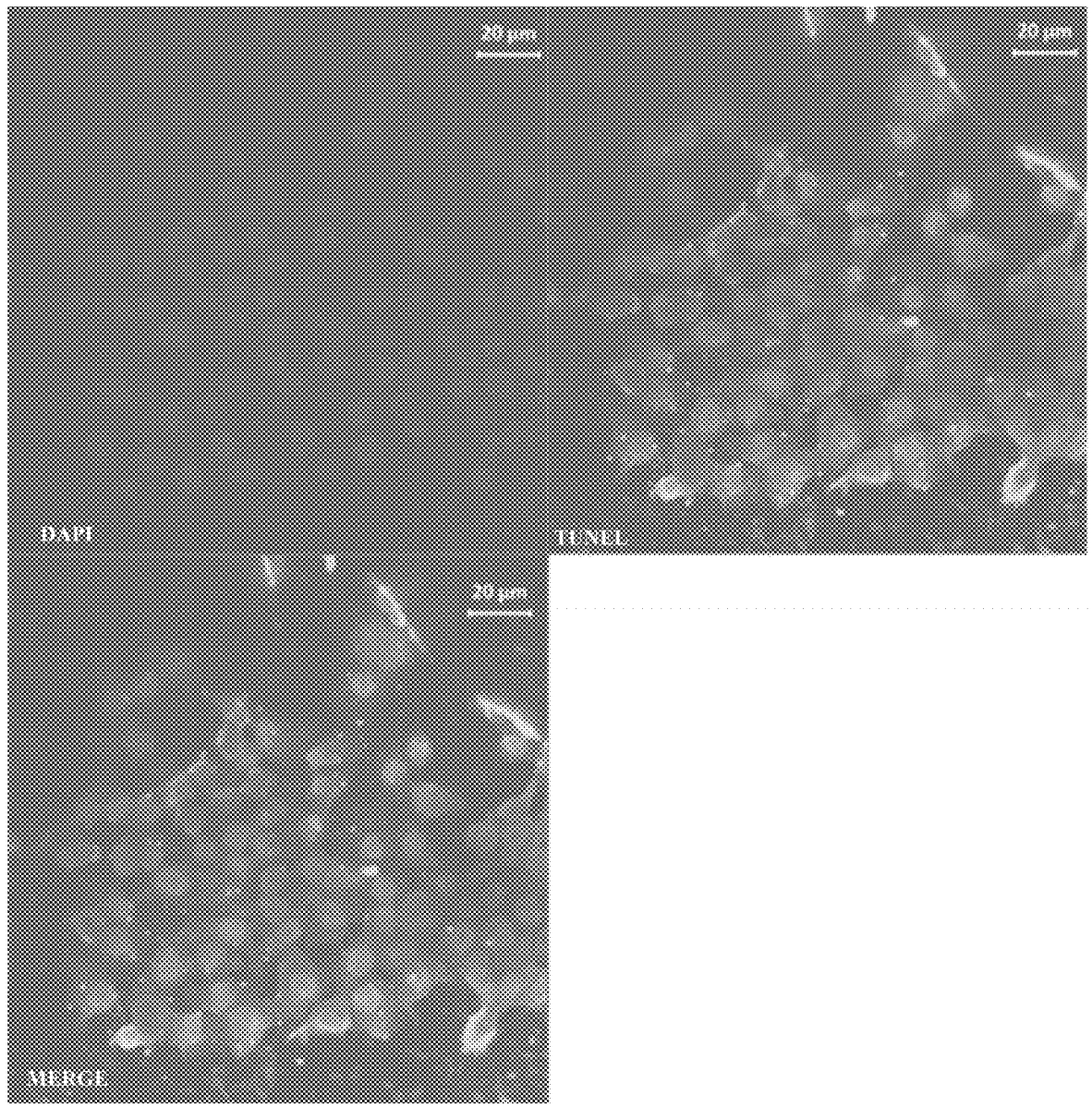

As shown in FIG. 5B, HCT 116 cells treated with Formula I for 72 hrs showed TUNEL positive (green fluorescence) DNA strand breaks in comparison to the negative control cells (FIG. 5A). These findings confirmed the apoptotic effect of Formula I on HCT 116 cells.

In Vitro Live Cell Imaging

HCT 116 cells were seeded in 6-well plate and treated with the IC50 of Formula I drug and incubated for 72 hours at temperature 37° C., 80% relative humidity and 5% CO2 and the cells' behavior was monitored through 72 hours by capturing a video using Olympus microscope.

CONCLUSION

From the previous findings, according to the carbonic anhydrase assay we found that the newly synthesized hCA IX inhibitory Formula I shows high affinity towards the hCA IX enzyme, which induces the tumor cell proliferation and tumor progression. Besides, based on the results of the apoptotic assay upon treating HCT 116 cancer cells with Formula I, we noticed that Formula 1 induce the apoptosis of the cells, while upon treating HUVEC (healthy human umbilical vein endothelial cells) shows more than 94% viability which indicates to slight toxicity. Finally, we can conclude that the novel and newly synthesized compound (2-(3-(2-Methyl-6-(p-tolyl) pyridine-3-yl) ureido) benzenesulfonamide) (Formula I) has anti-proliferative and apoptotic effect against Human Colorectal Cancer Cell Line HCT 116 with very slight toxicity on healthy human umbilical vein endothelial cells (HUVEC) cells.

REFERENCES

1. U.S. FOOD & DRUG ADMINISTRATION. *FDA expands approved use of Stivarga to treat liver cancer.* 2017 Apr. 27; Available from https://www.fda.gov/news-events/press-announcements/fda-expands-approved-use-stivarga-treat-liver-cancer.

2. Cui, J. J., et al., *Structure-based drug design of crizotinib (PF-02341066), a potent and selective dual inhibitor of mesenchymal-epithelial transition factor (c-MET) kinase and anaplastic lymphoma kinase (ALK).* J Med Chem, 2011. 54 (18): p. 6342-63.
3. Wilhelm, S., et al., *Discovery and development of sorafenib: a multikinase inhibitor for treating cancer.* Nat Rev Drug Discov, 2006. 5 (10): p. 835-44.
4. Wilhelm; Scott; (Orange, C. D. J. B., CT); Ladouceur; Gaetan; (Guilford, CT); Lynch; Mark; (Madison, CT); Scott; William J.; (Guilford, CT), Diaryl ureas with kinase inhibiting activity 2007 Jan. 25: U.S.
5. Roed Skarderud, M., et al., *Efficacy and safety of regorafenib in the treatment of metastatic colorectal cancer: A systematic review.* Cancer Treat Rev, 2018. 62: p. 61-73.
6. Zhang, L. and J. Yu, *Role of apoptosis in colon cancer biology, therapy, and prevention.* Curr Colorectal Cancer Rep, 2013. 9 (4): p. 013-0188.
7. Chen, D. et al., *Regorafenib inhibits colorectal tumor growth through PUMA-mediated apoptosis.* Clinical cancer research: an official journal of the American Association for Cancer Research, 2014. 20 (13): p. 3472-3484.
8. Sahu, A., et al., *Crizotinib: A comprehensive review.* South Asian J Cancer, 2013. 2 (2): p. 91-7.
9. Frampton, J. E., *Crizotinib: a review of its use in the treatment of anaplastic lymphoma kinase-positive, advanced non-small cell lung cancer.* Drugs, 2013. 73 (18): p. 2031-51.
10. Dai, X. et al., *(S)-crizotinib induces apoptosis in human non-small cell lung cancer cells by activating ROS independent of MTH1.* J Exp Clin Cancer Res, 2017. 36 (1): p. 017-0584.
11. Supuran, C. T., *Carbonic anhydrases: novel therapeutic applications for inhibitors and activators.* Nat Rev Drug Discov, 2008. 7 (2): p. 168-81.
12. Ozensoy Guler, O., C. Capasso, and C. T. Supuran, *A magnificent enzyme superfamily: carbonic anhydrases, their purification and characterization.* J Enzyme Inhib Med Chem, 2016. 31 (5): p. 689-94.
13. Supuran, C. T., *Carbonic Anhydrase Inhibition and the Management of Hypoxic Tumors.* Metabolites, 2017. 7(3).
14. De Simone, G. and C. T. Supuran, *Carbonic anhydrase IX: Biochemical and crystallographic characterization of a novel antitumor target.* Biochim Biophys Acta, 2010. 2: p. 404-9.
15. Pastorek, J. and S. Pastorekova, *Hypoxia-induced carbonic anhydrase IX as a target for cancer therapy: from biology to clinical use.* Semin Cancer Biol, 2015. 31: p. 52-64.
16. Lou, Y., et al., *Targeting tumor hypoxia: suppression of breast tumor growth and metastasis by novel carbonic anhydrase IX inhibitors.* Cancer Res, 2011. 71 (9): p. 3364-76.
17. Pacchiano, F. et al., *Selective hydrophobic pocket binding observed within the carbonic anhydrase II active site accommodate different 4-substituted-ureido-benzenesulfonamides and correlate to inhibitor potency.* Chem Commun, 2010. 46 (44): p. 8371-3.
18. Pacchiano, F., et al., *Ureido-substituted benzenesulfonamides potently inhibit carbonic anhydrase IX and show antimetastatic activity in a model of breast cancer metastasis.* J Med Chem, 2011. 54 (6): p. 1896-902.
19. Haggar, F. A. and R. P. Boushey, *Colorectal cancer epidemiology: incidence, mortality, survival, and risk factors.* Clinics in colon and rectal surgery, 2009. 22 (4): p. 191-197.
20. Kuipers, E. J., et al., *Colorectal cancer.* Nature reviews. Disease primers, 2015. 1: p. 15065-15065.
21. American Cancer Society. *Key statistics for colorectal cancer.* 2019; Available from https://www.cancer.org/cancer/colon-rectal-cancer/about/key-statistics.html.
22. Marley, A. R. and H. Nan, *Epidemiology of colorectal cancer.* International journal of molecular epidemiology and genetics, 2016. 7 (3): p. 105-114.
23. Eldehna, W. M., et al., *Design, synthesis and QSAR study of certain isatin-pyridine hybrids as potential anti-proliferative agents.* Eur J Med Chem, 2015. 90: p. 684-94.
24. Khalifah, R. G., *The carbon dioxide hydration activity of carbonic anhydrase. 1. Stop-flow kinetic studies on the native human isoenzymes B and C.* J Biol Chem, 1971. 246 (8): p. 2561-73.
25. Xu, X., et al., *Inhibition of DNA replication and induction of S phase cell cycle arrest by G-rich oligonucleotides.* J Biol Chem, 2001. 276 (46): p. 43221-30.
26. Okuno, K., et al., *Carbonic anhydrase IX enhances tumor cell proliferation and tumor progression in osteosarcoma.* Onco Targets Ther, 2018. 11: p. 6879-6886.

What is claimed is:

1. A compound of the following formula I named 2-(3-(2-Methyl-6-(p-tolyl) pyridine-3-yl) ureido) benzenesulfonamide

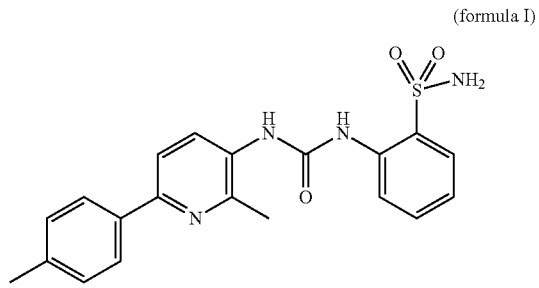 [SMILES: Cc1ccc(-c2ccc(NC(=O)Nc3ccccc3S(N)(=O)=O)c(C)n2)cc1]

(formula I)

or a pharmaceutically acceptable salt of the 2-(3-(2-Methyl-6-(p-tolyl) pyridine-3-yl) ureido) benzenesulfonamide.

2. The compound according to claim 1, wherein the compound is used as a carbonic anhydrase IX inhibitor.

3. The compound according to claim 2, wherein the compound is used as a medicament.

4. A method of inhibiting carbonic anhydrase IX enzyme activity and/or an overexpression in a subject in need thereof, comprising administering the compound of claim 1 or a pharmaceutically acceptable salt thereof to the subject.

5. A method of treating cancer in a subject, the method comprising administering to the subject a pharmaceutical composition comprising a therapeutically effective amount of the compound of claim 1 or a pharmaceutically acceptable salt thereof.

6. The method of claim 5, wherein the pharmaceutical composition further comprises a pharmaceutically acceptable carrier.

7. The method of 5, wherein the cancer is colorectal cancer.

8. A pharmaceutical composition comprising a pharmaceutical carrier and a therapeutically effective amount of the compound according to claim 1 or the pharmaceutically acceptable salt of the compound.

9. The method of the use of the compound according to claim 4, wherein the compound is used as a carbonic anhydrase IX inhibitor.

10. The method of the use of the compound according to claim 9, wherein the compound is used as the medicament.

11. The method of the use of the compound according to claim 5, wherein the compound is used as a carbonic anhydrase IX inhibitor.

12. The method of the use of the compound according to claim 11, wherein the compound is used as the medicament.

13. The pharmaceutical composition according to claim 8, wherein the compound is used as a carbonic anhydrase IX inhibitor.

14. The pharmaceutical composition according to claim 13, wherein the compound is used as a medicament.

* * * * *